(12) United States Patent
Grundmann et al.

(10) Patent No.: US 9,554,043 B2
(45) Date of Patent: *Jan. 24, 2017

(54) METHODS AND SYSTEMS FOR PROCESSING A VIDEO FOR STABILIZATION USING DYNAMIC CROP

(71) Applicant: Google Inc., Mountain View, CA (US)

(72) Inventors: Matthias Grundmann, Atlanta, GA (US); Vivek Kwatra, Santa Clara, CA (US); Irfan Essa, Atlanta, GA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,244

(22) Filed: Jul. 15, 2014

(65) Prior Publication Data
US 2014/0327788 A1 Nov. 6, 2014

Related U.S. Application Data

(63) Continuation of application No. 13/351,037, filed on Jan. 16, 2012, now Pat. No. 8,810,666.

(51) Int. Cl.
*H04N 5/232* (2006.01)

(52) U.S. Cl.
CPC ...... *H04N 5/23264* (2013.01); *H04N 5/23254* (2013.01); *H04N 5/23261* (2013.01); *H04N 5/23267* (2013.01)

(58) Field of Classification Search
CPC H04N 5/232; H04N 5/23254; H04N 5/23264; H04N 5/23267; H04N 5/23261
USPC .......................................... 348/208.6, 208.4
See application file for complete search history.

(56) References Cited

U.S. PATENT DOCUMENTS

| 7,221,390 B1 * | 5/2007 | Kutka .................. H04N 19/537 348/208.4 |
| 8,531,535 B2 * | 9/2013 | Kwatra ................. G06T 7/2033 348/155 |
| 8,810,666 B2 * | 8/2014 | Grundmann ....... H04N 5/23254 348/208.4 |
| 2003/0053545 A1 * | 3/2003 | Lainema .............. H04N 19/147 375/240.16 |

(Continued)

FOREIGN PATENT DOCUMENTS

| JP | 20060235689 | 9/2006 |
| JP | 2008005109 | 1/2008 |
| WO | 2011017823 | 2/2011 |

OTHER PUBLICATIONS

Supplementary European Search Report dated Jul. 17, 2015 from European Application No. EP 12866385, 8 pages.

(Continued)

*Primary Examiner* — Roberto Velez
*Assistant Examiner* — Abdelaaziz Tissire
(74) *Attorney, Agent, or Firm* — Lowenstein Sandler LLP

(57) ABSTRACT

Methods and systems for processing a video for stabilization are described. A recorded video may be stabilized by removing at least a portion of shake introduced in the video. An original camera path for a camera used to record the video may be determined. A crop window size may be selected, a crop window transform may accordingly be determined, and the crop window transform may be applied to the original video to provide a modified video from a viewpoint of the modified motion camera path.

20 Claims, 10 Drawing Sheets

(56) References Cited

U.S. PATENT DOCUMENTS

| | | | | |
|---|---|---|---|---|
| 2003/0151674 | A1* | 8/2003 | Lin | G06K 9/036 348/222.1 |
| 2005/0163348 | A1* | 7/2005 | Chen | G06T 7/20 382/107 |
| 2005/0275727 | A1* | 12/2005 | Lai | H04N 5/23248 348/208.1 |
| 2006/0017814 | A1* | 1/2006 | Pinto | H04N 5/145 348/208.4 |
| 2006/0088191 | A1* | 4/2006 | Zhang | G06K 9/00711 382/107 |
| 2006/0153472 | A1* | 7/2006 | Sakata | H04N 5/23248 382/255 |
| 2006/0228049 | A1* | 10/2006 | Gensolen | G06T 7/20 382/309 |
| 2006/0257042 | A1* | 11/2006 | Ofek | G06T 5/005 382/255 |
| 2007/0002146 | A1* | 1/2007 | Tico | G06T 5/50 348/208.1 |
| 2007/0154066 | A1* | 7/2007 | Lin | G06K 9/32 382/103 |
| 2008/0112630 | A1* | 5/2008 | Nestares | G06T 7/208 382/236 |
| 2008/0151064 | A1* | 6/2008 | Saito | H04N 5/23248 348/208.4 |
| 2008/0246848 | A1* | 10/2008 | Tsubaki | G06T 7/20 348/208.4 |
| 2008/0291285 | A1* | 11/2008 | Shimizu | H04N 5/144 348/208.6 |
| 2009/0066800 | A1* | 3/2009 | Wei | H04N 5/23254 348/208.99 |
| 2009/0079875 | A1* | 3/2009 | Yamauchi | G06T 7/2013 348/699 |
| 2009/0096879 | A1* | 4/2009 | Motomura | G03B 5/00 348/208.6 |
| 2009/0213234 | A1* | 8/2009 | Chen | H04N 5/23248 348/208.4 |
| 2009/0251594 | A1* | 10/2009 | Hua | G06T 11/00 348/441 |
| 2010/0053347 | A1* | 3/2010 | Agarwala | H04N 5/23267 348/208.99 |
| 2010/0208087 | A1* | 8/2010 | Ogawa | G06T 7/20 348/208.4 |
| 2010/0238355 | A1* | 9/2010 | Blume | G06T 7/2033 348/607 |
| 2012/0105654 | A1* | 5/2012 | Kwatra | G06T 7/2033 348/208.4 |
| 2012/0127329 | A1* | 5/2012 | Voss | H04N 5/23267 348/208.4 |
| 2012/0162454 | A1* | 6/2012 | Park | H04N 5/145 348/208.6 |
| 2013/0128066 | A1* | 5/2013 | Jin | G06T 7/0028 348/208.99 |
| 2015/0022677 | A1* | 1/2015 | Guo | H04N 5/23267 348/208.1 |

OTHER PUBLICATIONS

USPTO, Office Action for U.S Appl. No. 13/351,037, mailed 12-05-213.

USPTO, Notice of Allowance for U.S. Appl. No. 13/351,037, mailed Apr. 10, 2014.

Smith, Brandon et al., "Light Field Video Stabilization," IEEE International Conference on Computer Vision (ICCV), Sep. 29-Oct. 2, 2009, 8 pages.

Gleicher, Michael et al., "RE-Cinematography: Improving the Camera Dynamis of Casual Video," ACM Multimedia 2007, Sep. 2007, 10 pages.

Liu, Feng et al., "Content-Preserving Warps for 3D Video Stabilization," ACM Transactions on Graphics (Proceedings of ACM SIGGRAPH 2009), vol. 28, Nov. 3, 2009, 9 pages.

PCT International Search Report for International application No. PCT/US2012/064628, mailed Mar. 22, 2013, 3 pages.

* cited by examiner

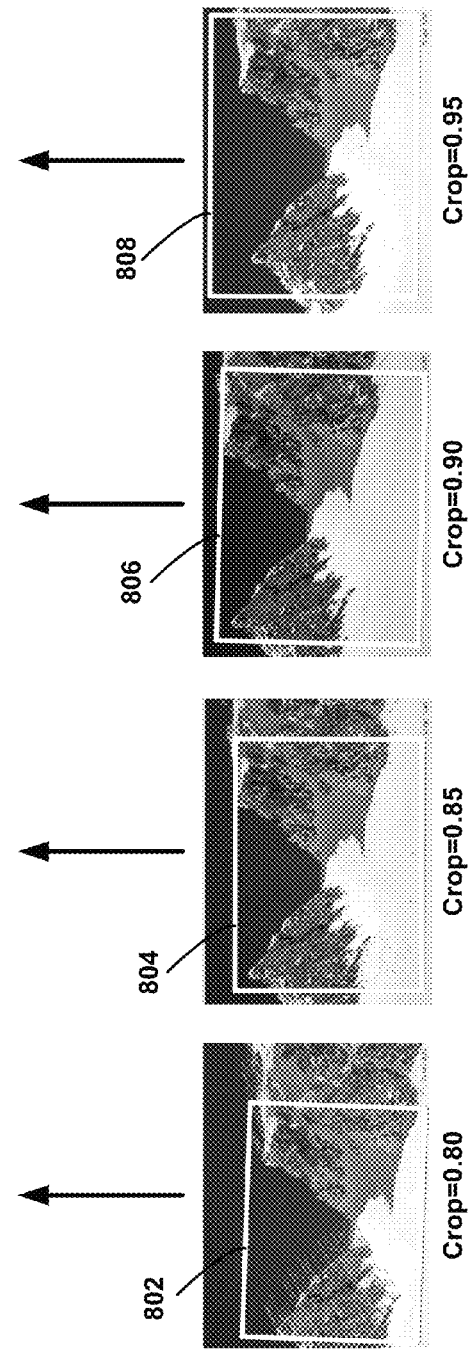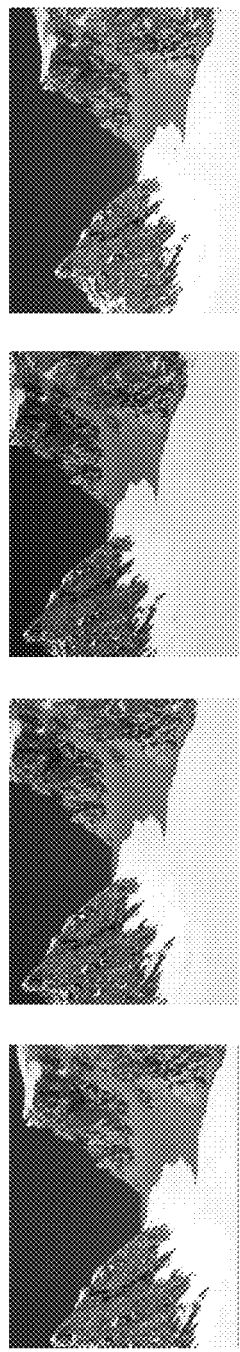

COMPUTER PROGRAM PRODUCT 1000

SIGNAL BEARING MEDIUM 1001

PROGRAM INSTRUCTIONS 1002

- DETERMINING AN ESTIMATION OF AN ORIGINAL MOTION PATH OF A CAMERA THAT RECORDED A VIDEO

- SELECTING A CROP WINDOW SIZE LESS THAN A SIZE OF A VIDEO FRAME OF THE VIDEO

- DETERMINING A CROP WINDOW TRANSFORM TO TRANSFORM THE ORIGINAL MOTION PATH OF THE CAMERA TO A MODIFIED MOTION CAMERA PATH, WHEREIN A CROP WINDOW ASSOCIATED WITH THE CROP WINDOW TRANSFORM IS CONSTRAINED TO THE CROP WINDOW SIZE

- DETERMINING A SMOOTHNESS METRIC INDICATIVE OF A DEGREE OF SMOOTHNESS OF THE MODIFIED MOTION CAMERA PATH

- BASED ON COMPARISON OF THE SMOOTHNESS METRIC TO A PREDETERMINED THRESHOLD, APPLYING THE CROP WINDOW TRANSFORM TO THE VIDEO TO PROVIDE A MODIFIED VIDEO FROM A VIEWPOINT OF THE MODIFIED MOTION CAMERA PATH

| COMPUTER READABLE MEDIUM 1003 | COMPUTER RECORDABLE MEDIUM 1004 | COMMUNICATIONS MEDIUM 1005 |
|---|---|---|

FIGURE 10

METHODS AND SYSTEMS FOR PROCESSING A VIDEO FOR STABILIZATION USING DYNAMIC CROP

RELATED APPLICATION

This application is a continuation of U.S. patent application Ser. No. 13/351,037, filed Jan. 16, 2012, which is hereby incorporated by reference in its entirety.

BACKGROUND

Video stabilization techniques may be used to improve recorded videos. With video cameras, camera shake can cause visible frame-to-frame jitter in a recorded video. For example, a handheld recorded video may be perceptibly shakier than a video recorded using a tripod-mounted camera (or other stabilization equipment, such as camera dollies or steady-cams) due to motion of the operator holding the camera during recording. However, recording videos using handheld video recording may enable more opportunities for filming.

Video stabilization techniques may be used to create a stable version of a casually shot video (e.g., a video recorded on a device with little or no stabilization equipment). Video stabilization techniques generally attempt to render the recorded video as if the video would have been recorded from a smooth or stable camera path.

SUMMARY

The present application discloses methods and systems for processing a video for stabilization using dynamic crop. In one aspect, a method is described. The method may comprise estimating an original motion path of a camera that recorded a video. The method may also comprise selecting a crop window size less than a size of a video frame of the video. The method may further comprise determining a crop window transform to transform the original motion path of the camera to a modified motion camera path. A crop window associated with the crop window transform may be constrained to the crop window size. The method may also comprise determining a smoothness metric indicative of a degree of smoothness of the modified motion camera path. The method may further comprise applying the crop window transform to the video to provide a modified video from a viewpoint of the modified motion camera path, based on comparison of the smoothness metric to a predetermined threshold.

In another aspect, a non-transitory computer readable medium having stored thereon instructions executable by a computing device to cause the computing device to perform functions is described. The functions may comprise an original motion path of a camera that recorded a video. The function may also comprise selecting a crop window size less than a size of a video frame of the video. The functions may further comprise determining a crop window transform to transform the original motion path of the camera to a modified motion camera path. A crop window associated with the crop window transform may be constrained to the crop window size. The functions may also comprise determining a smoothness metric indicative of a degree of smoothness of the modified motion camera path. The functions may further comprise applying the crop window transform to the video to provide a modified video from a viewpoint of the modified motion camera path, based on comparison of the smoothness metric to a predetermined threshold.

In still another aspect, a system is described. The system may comprise a camera path estimation module configured to receive a video, and to estimate an original motion path of a camera that recorded the video. The system may also comprise a video stabilization module in communication with the camera path estimation module and may be configured to select a crop window size less than a size of a video frame of the video, and to determine a crop window transform to transform the original motion path of the camera to a modified motion camera path. A crop window associated with the crop window transform may be constrained to the crop window size. The video stabilization module may further be configured to determine a smoothness metric indicative of a degree of smoothness of the modified motion camera path. The system may further comprise a video translation module in communication with the camera path estimation module and the video stabilization module and may be configured to apply the crop window transform to the video to provide a modified video from a viewpoint of the modified motion camera path based on comparison of the smoothness metric to a predetermined threshold.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 8A-8H illustrate example video frames from different video segments and example crop windows with varying sizes.

FIG. 10 is a schematic illustrating a conceptual partial view of an example computer program product that includes a computer program for executing a computer process on a computing device, arranged according to at least some embodiments presented herein.

DETAILED DESCRIPTION

Figure 1:
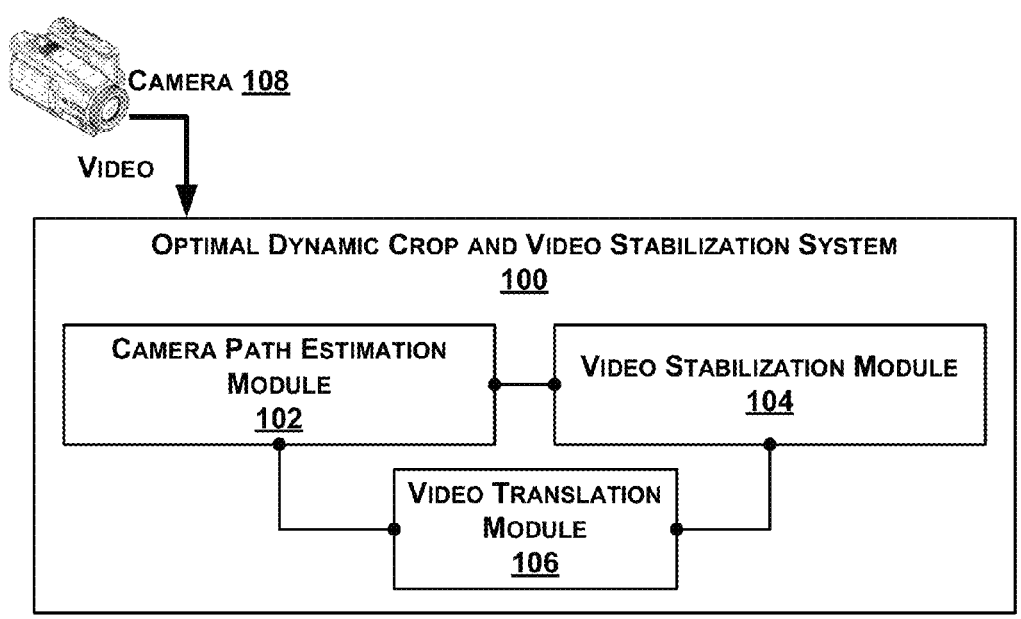
FIG. 1 illustrates a block diagram of an example optimal crop and video stabilization system.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

This disclosure may disclose systems and methods for stabilizing videos. A recorded video may be stabilized by removing at least a portion of shake introduced in the video. An original camera path for a camera used to record the video may be determined. A crop window size may be selected and a crop window transform may accordingly be determined. The crop window transform may describe a transform of the original camera path to a modified camera path that is smoother than the original camera path. A smoothness metric indicative of a degree of smoothness of the modified path may be determined. Based on a comparison of the smoothness metric to a predetermined threshold, for example, the crop window transform may be applied to the original video to obtain a stabilized modified video.

In one example, a video may be stabilized by performing post-processing techniques. The video may be processed to estimate an original path (e.g., motion) of a camera that recorded the video, to estimate a new steady/smooth camera path, and to recast the video from a viewpoint of the new smooth camera path. The steady or smooth camera path may dampen high-frequency jitter and remove low-frequency distortions that occur during handheld panning shots or videos recorded by a person walking, for example.

In one example, to estimate a new camera path, a crop window transform may be determined that can be applied to the original path to obtain the new path. A size of a crop window associated with the crop window transform may be constrained to be less than a size of an original frame size. To determine an optimal crop window size, an iterative method may be used, where a goal of the iterative method may be to determine a smooth camera path while removing or cropping out a least amount of content possible.

A smoothness metric indicative of a degree of smoothness of the new path may be determined. Whether the crop window size may be optimal or not may be determined based on comparison of the smoothness metric to a predetermine threshold. For example, if the smoothness metric exceeds a first predetermined threshold, the crop window size may be optimal and the crop window transform may be applied to the video to obtain a modified video from the viewpoint of the new smooth camera path. If the smoothness metric does not exceed the first predetermined threshold, a smaller crop window size may be selected and a respective smoothness metric may be determined for a respective new camera path. In an iterative manner, successively smaller crop window sizes may be selected and successive smoothness metrics may be determined until the first predetermined threshold may be exceeded by a given smoothness metric corresponding to a given crop window size, for example. In another example, iterations with successively smaller crop window sizes may continue and a difference in value between two consecutive smoothness metrics associated with two respective crop window sizes may be compared to a second predetermined threshold to determine whether smaller crop window sizes may improve smoothness of respective camera paths or not.

As a result of the iterative method, the optimal crop window size and a corresponding crop window transform may be determined and can be applied to the recorded video to recast the recorded video as if the video had been recorded from the smooth camera path to remove shake from the recorded video, for example.

Referring now to the Figures, FIG. 1 illustrates a block diagram of an example optimal dynamic crop and video stabilization system 100. The system 100 includes a camera path estimation module 102, a video stabilization module 104 in communication with the camera path estimation module 102, and a video translation module 106 in communication with the camera path estimation module 102 and the video stabilization module 104. The system 100 may be configured to receive a video from a camera 108, and to perform video stabilization processes on the video. For example, the camera path estimation module 102 may be configured to estimate a path of a camera that recorded the video based on motion of background objects within the received video. The video stabilization module 104 may then be configured to estimate a new steady/smooth camera path, and the video translation module 106 may be configured to recast the received video from a viewpoint of the smooth camera path determined by the video stabilization module 104. Components of the system 100 may be configured to work in an interconnected fashion with each other and/or with other components coupled to respective systems.

In one example, the camera path estimation module 102 may be configured to estimate a path of a camera that recorded the video based on motion of background objects or frames within the received video. A camera path may be estimated by extracting trackable features in frames of the video, matching features, and performing local outlier rejection to remove spurious matches that may distort motion estimation. Linear motion models (e.g., translation, similarity, affine) may be fit to tracked features to estimate a motion of the camera between two frames, and the motion models can be transformed to a common coordinate system and concatenated to yield an estimated original camera path over all frames of the video.

The video stabilization 104 may be configured to estimate a new steady/smooth camera path based on constraints. A smooth camera path can be estimated using minimization of derivatives of the original camera path as estimated by the camera path estimation module 102. For example, a constant path may represent a static camera, i.e.

$$\frac{dP}{dt} = 0$$

(where P is a function representing the camera path), a path of constant velocity may represent a panning or a dolly shot, i.e.

$$\frac{d^2P}{dt^2} = 0,$$

and a path of constant acceleration may represent ease-in and out transitions between static and panning cameras, $$\frac{d^3P}{dt^3} = 0.$$

An estimated smooth camera path may include segments of constant, linear, or parabolic motion. The segments may be static segments rather than a superposition of the segments to avoid residual motion.

In one example, to estimate a camera path P(t) comprising segments of constant, linear, and parabolic motion, an optimization may be performed as a constrained L1 minimization. For example, an N-dimensional vector norm of order p is defined as $$|x|_p = \left(\sum_{i=1}^{N} |x_i|^p\right)^{\frac{1}{p}},$$

which is a sum of the $p^{th}$ power of the absolute value of its components followed by the $p^{th}$ root of the result. An L1/L2 norm calculation may be performed using this standard. L1 minimization may result in a path with derivatives (described above) being zero for many segments. An L1 camera path may comprise segments resembling a static camera, linear motion, and constant acceleration. In another example, L2 minimization may be used to minimize the above derivatives on average to result in small, but possibly non-zero gradients (e.g., which may result in an L2 camera path that has some small non-zero motion).

In addition, a camera path P(t) can be determined that minimizes the above derivatives while satisfying constraints. A variety of constraints may be used such as an inclusion, proximity, and saliency constraints. As an example of a constraint, a crop window associated with a given crop window transform, which may transform the original camera path to the modified camera path, may be constrained to a given size.

The video stabilization module 104 may be configured to use an iterative method to determine an optimal crop window size. A goal of the iterative method may be to determine a smooth camera path while removing or cropping out a least content possible.

In the iterative method, the video stabilization module 104 may be configured to select a crop window size and to determine a corresponding crop window transform that transforms the original path to a modified path. The video stabilization module 104 may be configured to determine a smoothness metric indicative of a degree of smoothness of the modified path and to compare the smoothness metric to a first predetermined threshold to determine whether the crop window size selected may be optimal or not. In an example, if the smoothness metric exceeds a first predetermined threshold, then the crop window size may be designated as optimal. In the example, if the smoothness metric does not exceed the first predetermined threshold, a smaller crop window size may be selected and a respective smoothness metric may be determined for a respective modified path. In the example, the video stabilization module 104 may be configured to select successively smaller crop window sizes and to determine successive smoothness metrics until the first predetermined threshold may be exceeded by a given smoothness metric corresponding to a given crop window size. In the example, the video stabilization module 104 may also be configured to continue iterations using successively smaller crop window sizes and configured to compare a difference in value between two consecutive smoothness metrics associated with two respective crop window sizes to a second predetermined threshold to determine whether smaller crop window sizes may improve smoothness of respective modified camera paths or not. If comparison of the difference to the second predetermined threshold indicates that smaller crop window sizes may improve smoothness, iterations may continue. If not, then smaller crop window sizes may not improve smoothness enough to justify cropping out more content from the received video.

As a result of the iterative method, the optimal crop window size and a corresponding optimal crop window transform may be determined. The video translation module 106 may be configured to apply the optimal crop window transform to the recorded video to recast the recorded video as if the video had been recorded from the smooth camera path to remove shake from the recorded video, for example.

One or more of the described functions or components of the system 100 may be divided up into additional functional or physical components, or combined into fewer functional or physical components. In some further examples, additional functional and/or physical components may be added to the examples illustrated by FIG. 1. Still further, any of the camera path estimation module 102, the video stabilization module 104, and/or the video translation module 106 may include or be provided in the form of a processor (e.g., a micro processor, a digital signal processor (DSP), etc.) configured to execute program code including one or more instructions for implementing logical functions described herein. The system 100 may further include any type of computer readable medium (non-transitory medium) or memory, for example, such as a storage device including a disk or hard drive, to store the program code. In other examples, the system 100 may be included within other systems.

Figure 2:
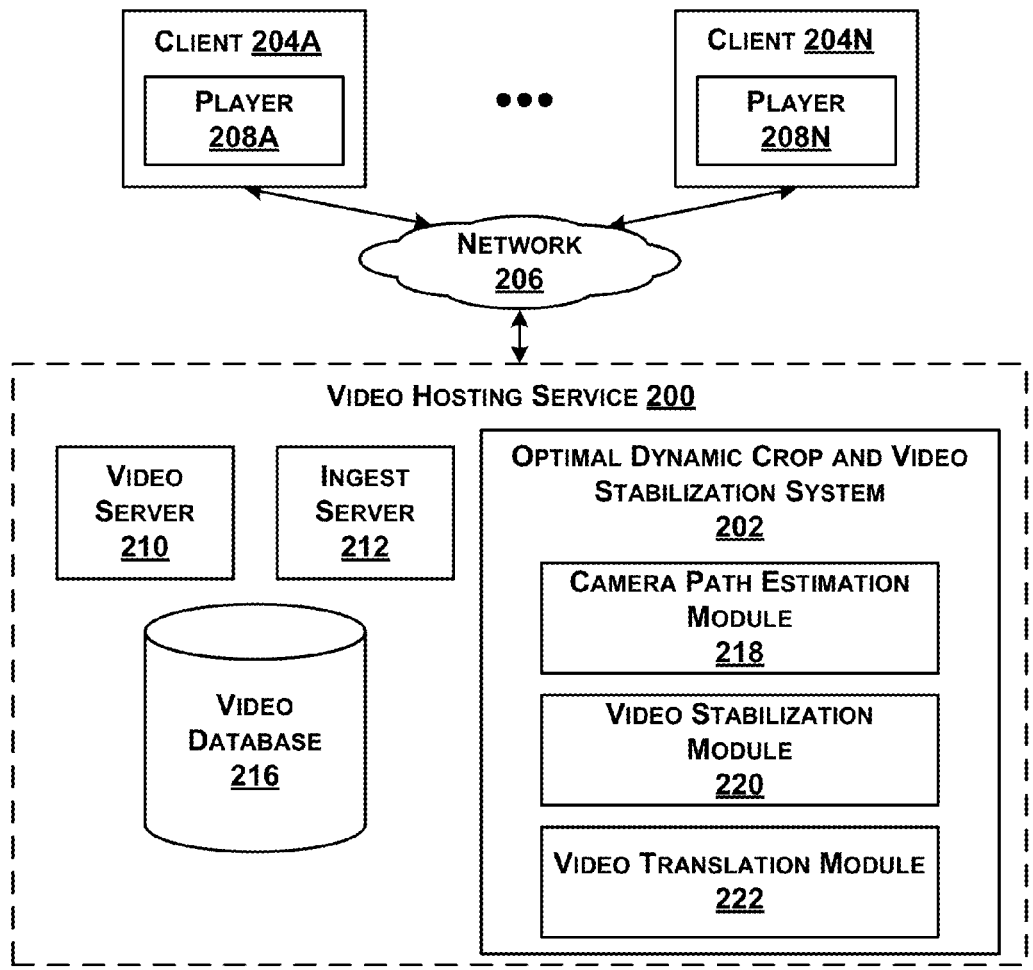
FIG. 2 is a block diagram illustrating an example system view of a video hosting service that includes the example optimal dynamic crop and video stabilization system.

FIG. 2 is a block diagram illustrating a system view of a video hosting service 200 that includes an optimal dynamic crop and video stabilization system 202. Multiple users/viewers may use clients 204A-N to send video hosting requests to the video hosting service 200, such as to upload videos to a video hosting website, and to receive the requested services from the video hosting service 200. The video hosting service 200 may be configured to communicate with the one or more clients 204A-N via a network 206. The video hosting service 200 may receive the video hosting service requests from the clients 204A-N over wired or wireless connections.

Turning to individual entities illustrated in FIG. 2, each client 204A-N may be used by a user to request video hosting services. For example, a user can use the client 204A to send a request for uploading a video for sharing, or playing a video. The clients 204A-N can be any type of computer device, such as a personal computer (e.g., desktop, notebook, tablet, laptop) computer, as well as devices such as a mobile telephone, personal digital assistant, or IP enabled video player. The clients 204A-N may include a processor, a display device (or output to a display device), and a local storage, such as a hard drive or flash memory device to which the clients 204A-N store data used by the user in performing tasks, and a network interface for coupling to the video hosting service 200 via the network 206.

The clients 204A-N may include video players 208A-N (e.g., the Flash™ player from Adobe Systems, Inc., or a proprietary one) for playing a video stream. The video players 208A-N may be standalone applications, or a plug-in to other applications such as a network or Internet browser. Where the client 204A-N is a general purpose device (e.g., a desktop computer, mobile phone), the players 208A-N may be implemented as software executed by the computer. Where the clients 204A-N are dedicated devices (e.g., dedicated video players), the players 208A-N may be implemented in hardware, or a combination of hardware and software. The players 208A-N may include user interface controls (and corresponding application programming interfaces) for selecting a video feed, starting, stopping, and rewinding a video feed. Also, the players 208A-N can include in a user interface a video display format selection configured to indicate a video display format (e.g., a standard definition TV or a high-definition TV). Other types of user interface controls (e.g., buttons, keyboard controls) can be used as well to control the playback and video format selection functionality of the players 208A-N.

The network 206 enables communications between the clients 204A-N and the video hosting service 200. In one example, the network 206 is the Internet, and uses standardized internetworking communications technologies and protocols, known now or subsequently developed that enable the clients 204A-N to communicate with the video hosting service 200. In another example, the network 206 may be a wireless cellular network that enables wireless communication between the clients 204A-N and the video hosting service 200.

The video hosting service 200 comprises an optimal dynamic crop and video stabilization system 202, a video server 210, an ingest server 212, and a video database 216. The video server 210 may be configured to serve videos from the video database 216 in response to user video hosting service requests. The ingest server 212 may be configured to receive user uploaded videos and store the videos in the video database 216. The video database 216 may be configured to store user uploaded videos and videos processed by the optimal dynamic crop and video stabilization system 202. In one example, the video database 216 stores a large video corpus.

The optimal dynamic crop and video stabilization system 202 may include a camera path estimation module 218, a video stabilization module 220, and a video translation module 222. The system 202 may be configured to receive user uploaded videos from the ingest server 212, and to perform video stabilization of the videos.

The video hosting service 200 may be configured to receive a video from a client of the clients 204A-N, and receive a single command by a single action of a user of the client requesting a stabilized video. Based on the single command, the optimal dynamic crop and video stabilization system 202 coupled to the video hosting service 200 may be configured to process the video to determine an optimal crop window size and accordingly determine an optimal crop window transform to recast the video from a viewpoint of a corresponding optimal camera path. A stabilized modified video recast from the viewpoint of the optimal camera path may then be provided to the user. In another example, the user may manually select a given crop window size and request from the video hosting service 200 to recast the video into a given modified video using the given crop window manually selected.

Figure 3A:
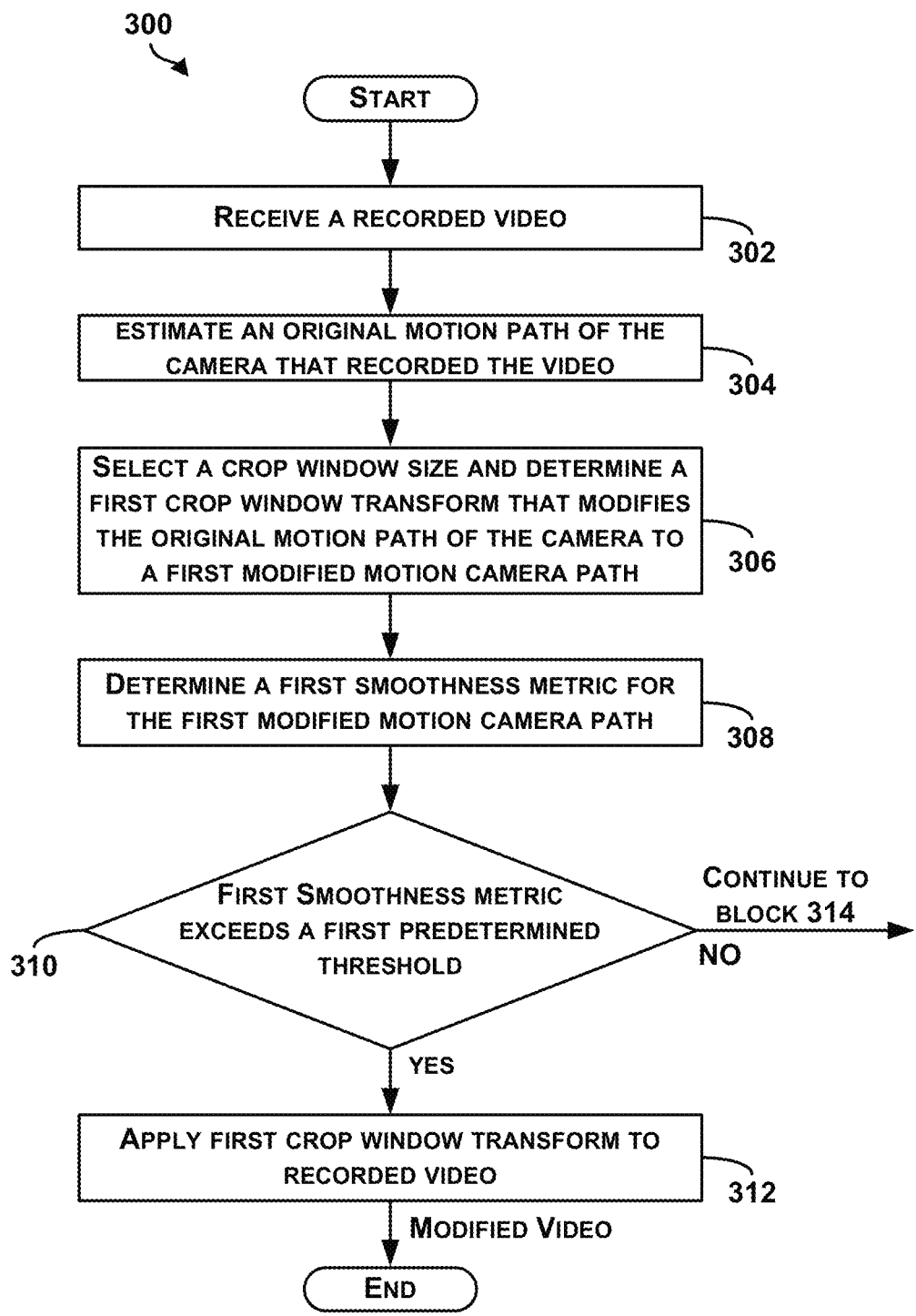
FIGS. 3A-3B are example flow charts of a method to process a video using optimal crop for video stabilization, in accordance with at least some embodiments described herein.
Figure 3B:
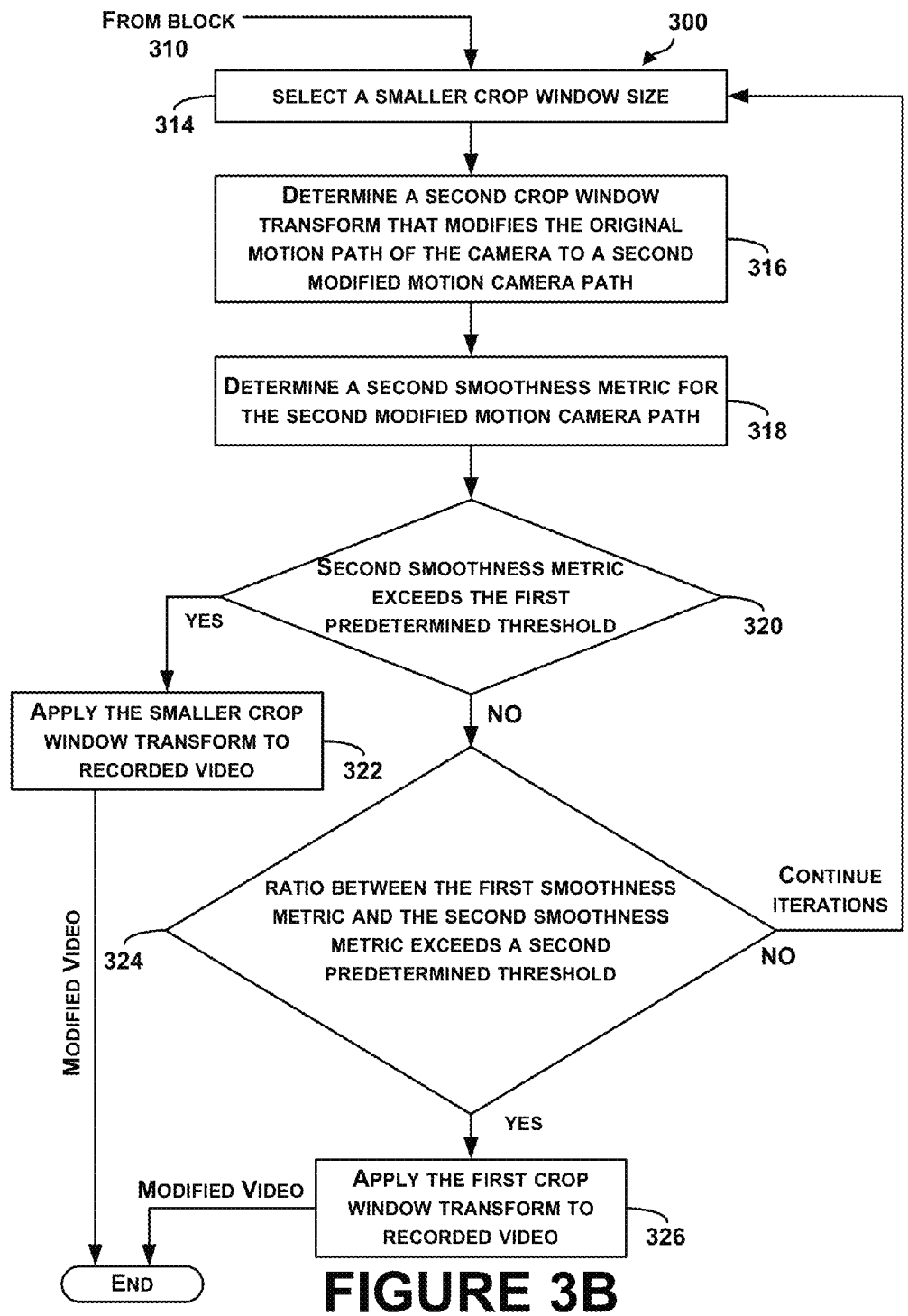

FIGS. 3A-3B are example flow charts of a method to process a video using optimal crop for video stabilization, in accordance with at least some embodiments described herein. Method 300 shown in FIGS. 3A-3B presents an example method that, for example, could be used with the systems 100 and 200, and may be performed by a device, a server, or a combination of the device and the server.

The method 300 may include one or more operations, functions, or actions as illustrated by one or more of blocks 302-326. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receive a recorded video. A camera may have recorded a video, for example, and the video may have been uploaded to and received at a device, such as a computer, laptop, mobile phone, etc., or a server.

At block 304, the method 300 includes estimate an original motion path of the camera that recorded the video. A processor or a computing device coupled to the device or server receiving the video may estimate a path of a camera that recorded the video based on motion of objects or images within the received video. A camera path may be estimated by extracting trackable features in frames of the video, matching features, and performing local outlier rejection to remove spurious matches that may distort motion estimation. Linear motion models (e.g., translation, similarity, affine) may be fit to the tracked features to estimate a motion of the camera between two frames, and the motion models can be transformed to a common coordinate system and concatenated to yield an estimated original camera path over all frames of the video. Those skilled in the art will appreciate that other algorithms and arrangements and other elements can be used to estimate the original motion path of the camera.

Figure 4:
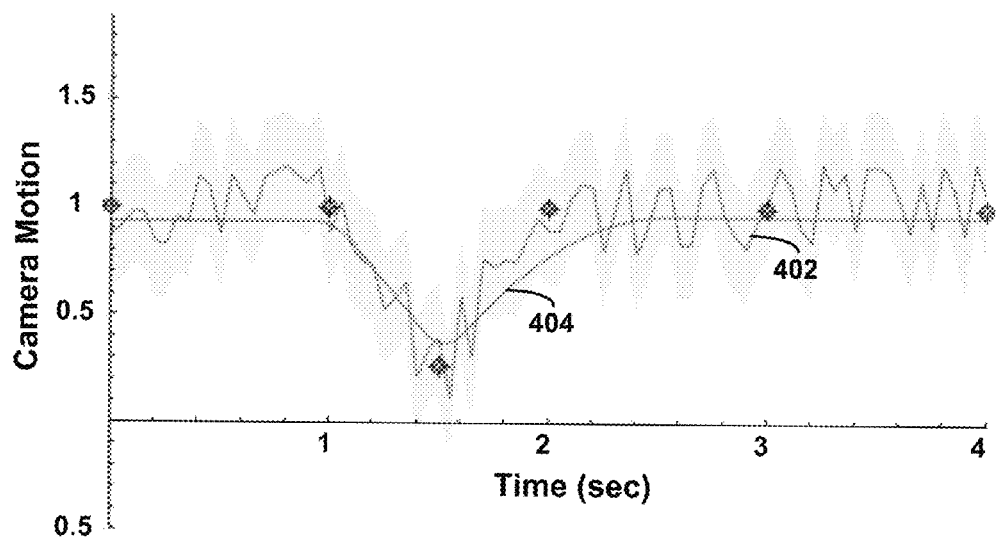
FIG. 4 illustrates an example graph of an optimal camera path and an original camera path.

Camera shake can cause visible frame-to-frame jitter in a recorded video. For example, a handheld recorded video may be perceptibly shakier than a video recorded using a tripod-mounted camera due to motion of the operator holding the camera during recording (e.g., the operator may be riding a car while recording the video). FIG. 4 shows an example original camera path 402 that illustrates such camera shake. A video recorded from a camera moving according to the original camera path 402 may include shaky video portions that may require stabilization.

At block 306, the method 300 includes select a crop window size and determine a first crop window transform that modifies the original motion path of the camera to a first modified motion camera path. To stabilize the video, the processor may be configured to determine a smooth or optimal modified camera path. For example, the smooth or optimal camera path P(t) can be partitioned into three segments, where only one may be present at each time t: a constant path, representing a static camera, i.e., $$\frac{dP}{dt} = 0,$$

a path of constant velocity, representing a panning or a dolly shot, i.e., $$\frac{d^2 P}{dt^2} = 0,$$

and a path of constant acceleration, representing an ease-in and out transition between static and panning cameras, i.e., $$\frac{d^3 P}{dt^3} = 0.$$

A connection of two different segments may have perceptively infinite acceleration, which may be noticeable as a sudden jerk in a video, and thus, a path of constant acceleration may be used. Given a continuous original camera path motion C(t), for example, a desired smooth path P(t) can be expressed as:

$$P(t) = C(t) * B(t) \quad \text{Equation (1)}$$

where $B(t) = C(t)^{-1} P(t)$ can be referred to as a crop window transform that can be applied to each video frame of the recorded video to obtain a stabilized video from a viewpoint of the smooth path P(t).

A steady or smooth camera path motion can be estimated by performing an L1 optimization with imposed constraints. An example constraint may include constraining the crop window associated with the crop window transform B(t) to a crop window size selected at block 306 (e.g., 95% of a given video frame size). The optimization may determine a stable camera path P(t) by minimizing an objective function:

$$O(P) = a\left|\frac{dP}{dt}\right| + b\left|\frac{d^2 P}{dt^2}\right| + c\left|\frac{d^3 P}{dt^3}\right| \quad \text{Equation (2)}$$

with linear weights a, b and c such that the crop window associated with B(t) is constrained to the crop window size selected, for example. The crop window transform B(t) may remove spatial content within the video or video frames to stabilize the video by applying the crop window associated with the crop window transform B(t) to each video frame to remove all content outside the crop window. Equation (2) can be minimized by setting each derivative equal to zero, for example. Thus, the derivatives can be defined at different points along the camera path (e.g., per frame), and a derivative can be determined at every point (every frame).

In one example, minimizing the objective function and determination of the modified motion camera path may include sampling every frame of the received video and performing computations on every frame. Alternatively, to possibly improve computational efficiency, frames of the receive video may be temporally subsampled by a factor k, as an example. In the example, a $k^{th}$ transform for $k^{th}$ frame may be replaced by a concatenation of previous k transforms. Temporal subsampling may accordingly comprise minimizing a modified objective function:

$$O(P) = a\left|\frac{dP(kt)}{dt}\right| + b\left|\frac{d^2 P(kt)}{dt^2}\right| + c\left|\frac{d^3 P(kt)}{dt^3}\right| \quad \text{Equation (3)}$$

Equivalently, using the chain rule, equation (3) may be written as:

$$O(P) = ak\left|\frac{dP(kt)}{dt}\right| + bk^2\left|\frac{d^2 P(kt)}{dt^2}\right| + ck^3\left|\frac{d^3 P(kt)}{dt^3}\right| \quad \text{Equation (4)}$$

Equation (4) may suggest that a linear weight multiplied by an $i^{th}$ derivative may further be multiplied by $k^i$ to accomplish temporal subsampling.

Referring back to FIG. 4, an example optimal camera path 404 is illustrated. The optimal camera path 404 may remove portions of the jitter and high frequency motion included in the original camera path 402, for example.

Referring back to FIG. 3A at block 306, for the selected crop window size, a first crop window transform and a first modified path may be determined by minimizing the objective function O(P) expressed in equation (2) or equation (4). The objective function evaluated at the first modified path may be expressed as $O(P_1)$. The smoother the first modified path, the smaller the first objective function $O(P_1)$.

At block 308, the method 300 includes determine a first smoothness metric for the first modified motion camera path. For the first modified path determined at block 306, a first smoothness metric can be determined. A first smoothness metric corresponding to the objective function evaluated at the first modified path $O(P_1)$ may be expressed as S(P). The first smoothness metric may, for example, be a function of $O(P_1)$. As a specific example, since the smaller an objective function value, the smoother a corresponding modified path may be, a smoothness metric may include a reciprocal of the objective function evaluated at the corresponding modified path. In this specific example, the smaller the objective function evaluated at the corresponding modified path, the larger the reciprocal of the objective function and thus the larger the smoothness metric. Other functions that may produce a value indicative of a degree of smoothness of a given modified path may be possible.

At decision block 310, the method 300 may include determining whether the first smoothness metric associated with the first modified path exceeds a first predetermined threshold. The processor may compare the first smoothness metric $S(P_1)$ determined at block 308 to a first predetermined threshold. In one example, the first predetermined threshold may represent an absolute level of smoothness that may indicate how close the first modified path may be to being a constant path. For example, an objective function value $O(P_1)$ close to zero may indicate that the first modified path may be close to being a constant path. An objective function value close to zero (e.g., below about 0.002), or a corresponding smoothness metric (e.g., greater than about 500) may be chosen as the first predetermined threshold, for example. Other values may be chosen. In other examples, the objective function value may be chosen as a smoothness indicator and the method 300 at block 310 may include determining whether the objective function value, as a smoothness indicator, may be below a given threshold or not. Exceeding the first predetermined threshold is used in describing block 310 of the method 300 for illustration only. Generally, the smoothness metric may be compared to a given threshold to determine how close the first modified path may be to being a constant path.

At block 312, the method 300 includes apply first crop window transform to recorded video. For example, if the first smoothness metric compares favorably with the first predetermined threshold (e.g., the first smoothness metric $S(P_1)$ exceeds the first predetermined threshold, or alternatively the objective function $O(P_1)$ is below a given threshold), the crop window size may be designated as optimal and the processor may apply the first crop window transform to the received video to provide a modified (smoother) video from the viewpoint of the first modified path. The crop window associated with the first crop window transform B(t)—and constrained to the crop window size selected and determined to be optimal—may be applied to frames of the received video to remove spatial content within the frames and stabilize the received video.

Figure 5:
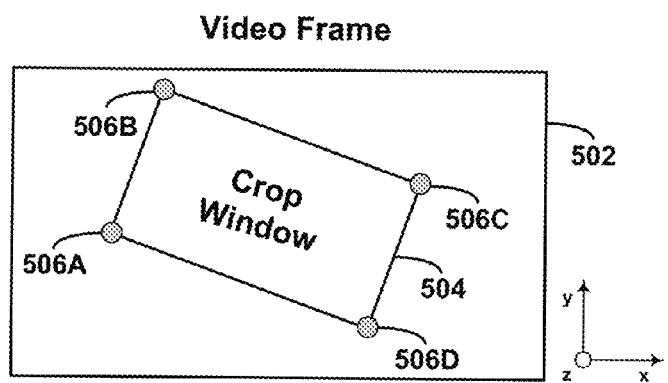
FIG. 5 illustrates an example video frame and an example crop window.

FIG. 5 illustrates an example video frame and an example crop window. Rectangular frame 502 may be an original video frame and crop window 504 may be a transformed crop window—transformed by the first crop window transform B(t)—and may be constrained to the crop window size selected and determined to be optimal. In FIG. 5, as an example, the crop window 504 is shown as rotated with respect to the z-axis by the first crop window transform B(t). Four corners 506A-D of the crop window transformed by the crop window transformation B(t) are shown residing inside the rectangular frame 502.

Referring now to FIG. 3B, at block 314, the method 300 includes select a smaller crop window size (e.g., 90%). In an example, exceeding the first predetermined threshold may not be possible with the crop window size selected at block 306, and a second smaller crop window size may be selected to remove more content from the frames of the received video to stabilize the received video.

At block 316, the method 300 includes determine a second crop window transform that modifies the original motion path of the camera to a second modified motion camera path. The processor may determine a second crop window transform corresponding to the smaller crop window size selected. The second crop window transform may modify the original motion path of the camera to a second modified motion camera path.

At block 318, the method 300 includes determine a second smoothness metric for the second modified motion camera path. The processor may determine a second smoothness metric $S(P_2)$ corresponding to the second modified motion camera path. The second smoothness metric $S(P_2)$ may be indicative of a degree of smoothness of the second modified motion camera path and may include a function of the objective function $O(P_2)$ evaluated at the second modified motion camera path.

At block 320, the method 300 determines whether the second smoothness metric $S(P_2)$ exceeds the first predetermined threshold. Similar to description at block 310, the second smoothness metric may be compared to the first predetermined threshold, which may represent the absolute level of smoothness and may indicate how close the second modified path may be to being a constant path.

At block 322, the method 300 includes apply the second crop window transform to recorded video. For example, if the second smoothness metric compares favorably with the first predetermined threshold (e.g., the second smoothness metric $S(P_2)$ exceeds the first predetermined threshold, or alternatively the objective function value $O(P_2)$ is below a given threshold), the smaller (second) crop window size may be designated as optimal and the processor may apply the second crop window transform to the received video to provide a modified (smoother) video from the viewpoint of the second modified path.

At block 324, the method 300 determines whether a ratio between the first smoothness metric and the second smoothness metric exceeds a second predetermined threshold. A change in value between the first smoothness metric and the second smoothness metric may be determined to evaluate an effect of choosing the smaller crop window size on smoothness of the modified path and thus the received video. In one example, the change can be determined by evaluating a difference in value between the first smoothness metric and the second smoothness metric. In another example, a ratio between the first smoothness metric and the second smoothness metric may be determined to indicate a relative smoothness of the second modified path as compared to the first modified path. The ratio between the first smoothness metric and the second smoothness metric may be determined and compared to a second predetermined threshold $r_s$ that may be referred to as a relative smoothness threshold. The ratio between the first and the second smoothness metrics may be expressed as $$r = \frac{S(P_1)}{S(P_2)},$$

which may equivalently be expressed as the ratio between the second and first objective function values $$r = \frac{O(P_2)}{O(P_1)},$$

for example, if the smoothness metric is determined as the reciprocal of the objective function value. As a specific example, a ratio $$r = \frac{O(P_2)}{O(P_1)}$$

that exceeds the second predetermined threshold $r_s$=0.8 (i.e., change in value from the first objective function value to the second objective function value is less than 20% of the first objective function value) may indicate that using a smaller crop window size may not be justified. In this specific example, the second smoothness metric may be close in value to the first smoothness metric such that the second modified path corresponding to the smaller crop window size may not be smoother than the first modified path by a large enough value to justify cropping out more content. In the specific example, the first modified path may be designated as optimal. Other $r_s$ values can be used. Other measure of relative smoothness may be used as well. For example, a difference in value between the second smoothness metric and the first smoothness metric may be calculated and compared to a given threshold. If the difference is smaller than the give threshold, for example, then the first crop window size may be designated as optimal. Calculating a ratio between the first smoothness metric and the second smoothness metric is used to describe the method 300 for illustration only.

At block 326, the method 300 includes apply the first crop window transform to recorded video. For example, if the ratio determined at block 324 compares favorably with the second predetermined threshold $$\left(\text{e.g., } r = \frac{S(P_1)}{S(P_2)} > r_s, \text{ or alternatively } r = \frac{O(P_2)}{O(P_1)} > r_s\right),$$

the larger (first) crop window size may be designated as optimal and the processor may apply the first crop window transform to the received video to provide a modified (smoother) video from the viewpoint of the first modified path.

If at block 324, the method 300 determines that the ratio between the first smoothness metric and the second smoothness metric does not exceed the second predetermined threshold, iterations may continue by selecting an even smaller crop window size and repeating steps in the method 300 until either of conditions described at blocks 320 or 324 may be met. That is, until either a given smoothness metric exceeds the first predetermined (absolute smoothness) threshold, or the ratio between two smoothness metrics corresponding to two successive crop window sizes exceeds the second predetermined (relative smoothness) threshold.

Figure 6A:
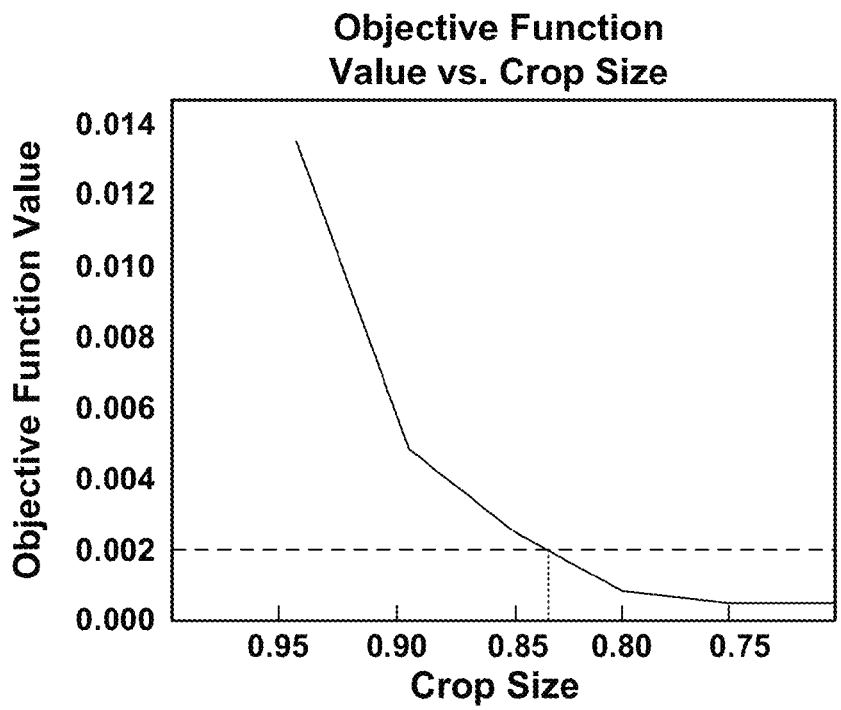
FIGS. 6A-6B illustrate example graphs showing change of an objective function value with respect to crop window sizes.

FIG. 6A illustrates an example graph showing change of an objective function value with respect to crop window sizes for a given video. More specifically, FIG. 6A shows the value of the objective function O(P) for crop window sizes 95%, 90%, 85%, 80%, and 75% of an original received video frame size. For crop window sizes 95%, 90%, and 85%, the objective function value is higher than an absolute smoothness threshold (e.g., 0.002), which may indicate that the smoothness metric does not exceed the first predetermined threshold. For a crop window size 80%, the objective function value is shown to be below 0.002, which may indicate that the smoothness metric exceeds the first predetermined threshold. The crop window size 80% may be designated as optimal and the corresponding crop window transform may be applied to the received video to provide a smoother video, for this example.

Figure 6B:
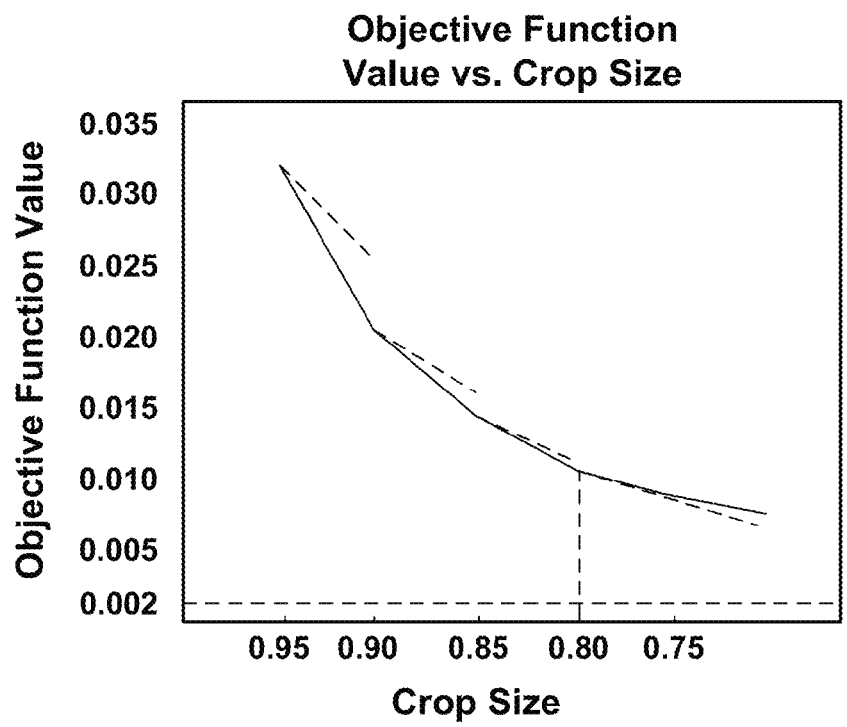

FIG. 6B illustrates another example graph for another video showing change of an objective function value with respect to crop window sizes. In FIG. 6B, the objective function value does not cross below the 0.002 absolute smoothness threshold, which may indicate that for this video determining an optimal modified path that may be a constant path with the corresponding objective function being close to zero may not be possible.

In FIG. 6B, a relative smoothness threshold $r_s$=0.8 is indicated by dashed lines. A change in value of the objective function value may be compared to the relative smoothness threshold $r_s$ by determining whether a solid line is locally above or below a dashed line. For example, a ratio between two objective function values, corresponding to two consecutive crop window sizes, that is less than the relative smoothness threshold $r_s$ may be indicated by a solid line being locally below a dashed line. A ratio that is greater than the relative smoothness threshold $r_s$ may be indicated by the solid line being locally above the dashed line.

As a specific example in FIG. 6B, a change in the objective function value between the two consecutive crop window sizes 80% and 75% is greater than the relative smoothness threshold $$r_s\left(r = \frac{O(P_2)(\text{at a crop window size of } 75\%)}{O(P_1)(\text{at a crop window size of } 80\%)} > 0.8\right),$$

which is indicated by the solid line being locally above a dashed line. In this specific example, a crop window size less than 80% (e.g., 75%) may not improve smoothness enough to justify discarding more content. In the specific example, the crop window size of 80% may therefore be considered optimal.

In some examples, the received video may have been a stable video except for a given portion of the received video that may be shaky. For instance, the received video may have recorded from a camera held by a user riding in a car and the car ride may have been smooth except for hitting a series of bumps that may cause the camera to shake and for a video being recorded by the camera to include a shaky portion. A global optimal crop window size for the video as a whole may be determined using the method 300, for example. However, the global optimal crop window size may be determined to crop out content from the video to stabilize the video in the shaky portion of the video, but also removing content from other parts of the video that may have been stable.

As an alternative to determining the global optimal crop window, the received video may be divided into multiple segments and an optimal crop window size may be determined for each segment. Each segment may include a sequence of several frames. Temporal partitions may be used such that each segment may be of a given length in time (e.g., about 3-5 seconds). Any temporal partition can be used and the segments may or may not be of the same length of time or include the same number of frames.

An optimal crop window determined for a segment of the video including the shaky portion may be small (e.g., 75% of an original video frame size) to stabilize the shaky portion of the video, while optimal crop windows for other segments may be large (e.g., 95% of original video frame size) since the other segments may have been more stable and smoother than the segment including the shaky portion. Determining different crop window sizes for different video segments of a video may be referred to as dynamic cropping.

Figure 7A:
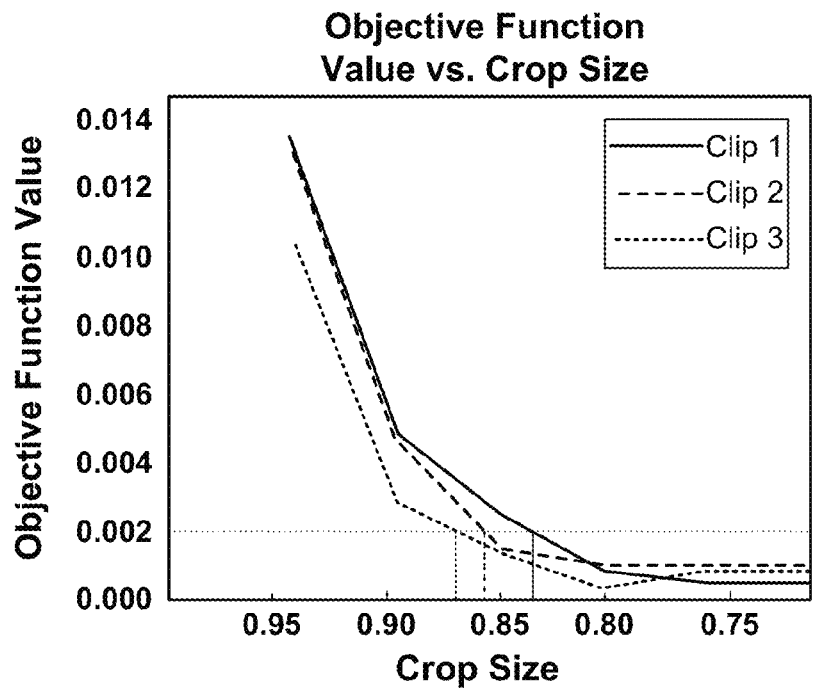
FIGS. 7A-7B illustrate example graphs showing change of an objective function value with respect to crop window sizes for multiple video segments within a video.
Figure 7B:
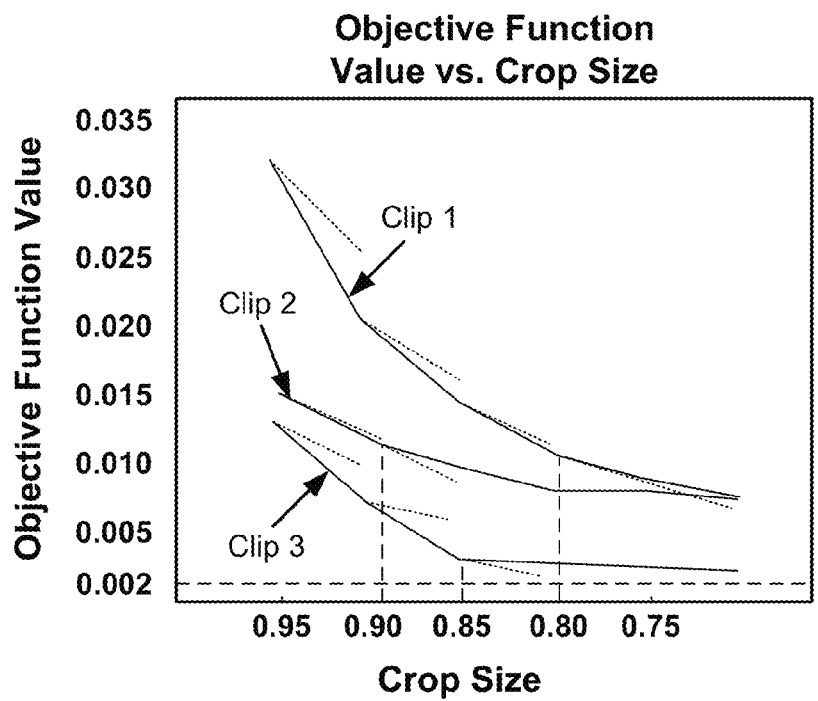

FIGS. 7A-7B illustrate example graphs showing change of an objective function value with respect to crop window sizes for multiple video segments within a video. Specifically, FIG. 7A illustrates change of the objective function value with respect to crop window sizes of three clips of a video. For clip 1, for example, an optimal crop window size may be determined to be 80%, i.e., a crop window size of 80% causes an objective function value for clip 1 to be below an absolute smoothness threshold (e.g., 0.002). For clips 2 and 3, the optimal crop window size may be determined to be 85% as shown in FIG. 7A.

FIG. 7B illustrates another example of objective function values changing with crop window sizes for three clips included in another video. In FIG. 7B, the objective function values of the three clips may not cross the absolute smoothness threshold (e.g., 0.002) and a relative smoothness threshold can be used to determine optimal crop window sizes for the three clips. When a dashed line may locally be below a solid line for a given clip, the optimal crop window size for the given clip may be determined. In FIG. 7B, for clip 1, a crop window size of 80% may be considered optimal, for clip 2, a crop window size of 90% may be considered optimal, and for clip 3, a crop window size of 85% may be considered optimal. Clip 1 may have required a smaller crop window size indicating that clip 1 may include portions that may be shakier or more unstable than clips 2 and 3. For, the video clips in FIG. 7B, if a global optimal crop window size is determined for the video as a whole, a crop window size of 80% may have been selected to stabilize clip 1 but may discard more content from clips 2 and 3 without making clips 2 and 3 smoother.

FIGS. 8A-8H illustrate example video frames from different conceptual video segments and example crop windows with varying sizes. FIGS. 8A, 8C, 8E, and 8G illustrate video frames in sequential order that were recorded and include shaky and unstable video content. FIGS. 8B, 8D, 8F, and 8H illustrate modified video frames that remove jitter or high frequency inputs and can be played-out in sequential order to represent a smooth version of the original video.

For example, FIG. 8A shows an original frame obtained from an original first video segment of a video and FIG. 8B shows a modified frame after an optimal crop window 802 that is 80% of the original frame size is applied to the original frame in FIG. 8A. The optimal crop window 802 may, for example, have been estimated by the method 300. Also, FIG. 8C shows an original frame obtained from an original second video segment of the video and FIG. 8D shows a modified frame after an optimal crop window 804 that is 85% of the original frame size is applied to the original frame in FIG. 8C. Similarly, FIG. 8E shows an original frame obtained from an original third video segment of the video and FIG. 8F shows a modified frame after an optimal crop window 806 that is 90% of the original frame size is applied to the original frame in FIG. 8E. Also, FIG. 8G shows an original frame obtained from an original fourth video segment of the video and FIG. 8H shows a modified frame after an optimal crop window 808 that is 95% of the original frame size is applied to the original frame in FIG. 8G. Optimal crop window sizes may suggest that the original second video segment may be smoother than the original first video segment, since an optimal crop window size determined for the original first video segment is smaller than the optimal crop window size determined for the original second video segment. Similarly, the original third video segment may be smoother or more stable than the original second video segment and the original fourth video segment may be smoother or more stable than the original third video segment. In FIGS. 8A-8H, a given crop window may be rotated about the z-axis or translated with respect to a center of a respective original frame depending on a respective crop window transform determined for a respective video segment.

In one example, to achieve consistency across clips, a video may be divided into more than one video segment such that a given portion of two consecutive video segments overlap for a predetermined period of time. In the given portion, a second modified motion camera path for a second video segment of the two consecutive video segments may be determined by scaling a first modified motion camera path determined for the first video segment of the two consecutive video segments. A first optimal crop window size $c_{opt,i}$ may be determined for the first segment and a second optimal crop window size $c_{opt,i}$ may be determined for the second segment. The second modified motion camera path $P_{i+1}$ of the second video segment may be constrained in the given portion overlapping the first segment to be $P_{i+1} = P_i \cdot S$, where S may be defined as a similarity or a scaling transform with a uniform scale $$\frac{c_{opt,i}}{c_{opt,i+1}}.$$

Figure 9:
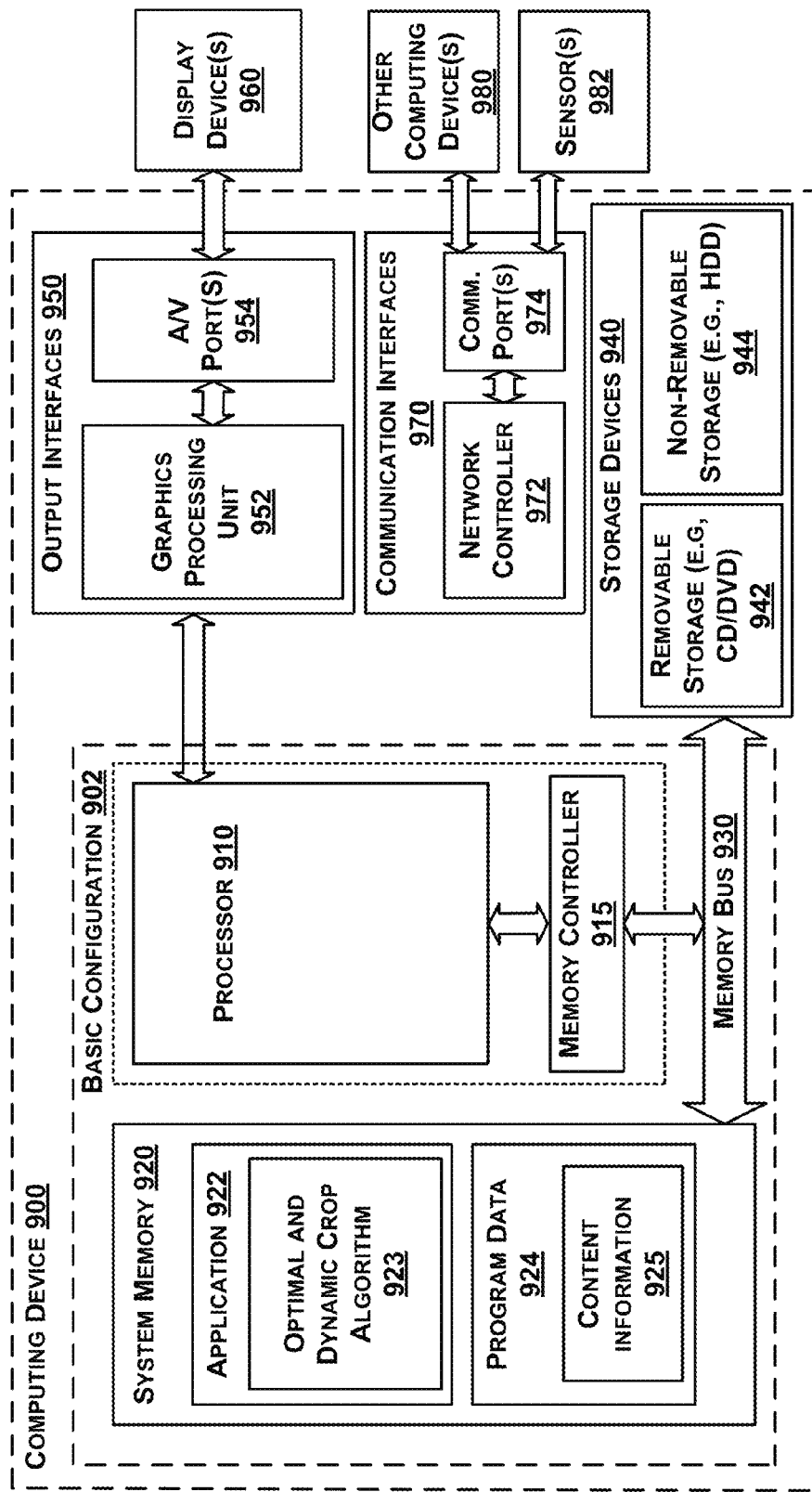
FIG. 9 is a functional block diagram illustrating an example computing device used in a computing system that is arranged in accordance with at least some embodiments described herein.

FIG. 9 is a functional block diagram illustrating an example computing device 900 used in a computing system that is arranged in accordance with at least some embodiments described herein. The computing device may be a personal computer, mobile device, cellular phone, video game system, or global positioning system, and may be implemented as a client device, a server, a system, a combination thereof, or as a portion of components described in FIGS. 1-2. In a basic configuration 902, computing device 900 may include one or more processors 910 and system memory 920. A memory bus 930 can be used for communicating between the processor 910 and the system memory 920. Depending on the desired configuration, processor 910 can be of any type including but not limited to a microprocessor (µP), a microcontroller (µC), a digital signal processor (DSP), or any combination thereof. A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 may include one or more applications 922, and program data 924. Application 922 may include optimal and dynamic crop algorithm 923 that is arranged to provide inputs to the electronic circuits, in accordance with the present disclosure. Program Data 924 may include content information 925 that could be directed to any number of types of data. In some example embodiments, application 922 can be arranged to operate with program data 924 on an operating system.

Computing device 900 can have additional features or functionality, and additional interfaces to facilitate communications between the basic configuration 902 and any devices and interfaces. For example, data storage devices 940 can be provided including removable storage devices 942, non-removable storage devices 944, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 920 and storage devices 940 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include output interfaces 950 that may include a graphics processing unit 952, which can be configured to communicate to various external devices such as display devices 960 or speakers via one or more A/V ports 954 or a communication interface 970. The communication interface 970 may include a network controller 972, which can be arranged to facilitate communications with one or more other computing devices 980 and one or more sensors 982 over a network communication via one or more communication ports 974. The one or more sensors 982 are shown external to the computing device 900, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

In some embodiments, the disclosed methods may be implemented as computer program instructions encoded on a computer-readable storage media in a machine-readable format, or on other non-transitory media or articles of manufacture. FIG. 10 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more program instructions 1002 that, when executed by one or more processors may provide functionality or portions of the functionality described above with respect to FIGS. 1-9. Thus, for example, referring to the embodiments shown in FIGS. 3A-3B one or more features of blocks 302-326 may be undertaken by one or more instructions associated with the signal bearing medium 1001. In addition, the program instructions 1002 in FIG. 10 describe example instructions as well.

In some examples, the signal bearing medium 1001 may encompass a computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming to the IEEE 802.11 standard or other transmission protocol).

The one or more programming instructions 1002 may be, for example, computer executable and/or logic implemented instructions. In some examples, a computing device such as the computing device 900 of FIG. 9 may be configured to provide various operations, functions, or actions in response to the programming instructions 1002 conveyed to the computing device 900 by one or more of the computer readable medium 1003, the computer recordable medium 1004, and/or the communications medium 1005. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining an estimation of an original motion path of a camera that recorded a video;
   selecting a crop window size being less than a size of a video frame of the video;
   determining a crop window transform to transform the original motion path of the camera to a modified motion camera path, wherein a crop window associated with the crop window transform is constrained to the crop window size;
   identifying a first smoothness metric indicative of a degree of smoothness of the modified motion camera path;
   applying the crop window transform to crop the video, in view of the crop window and the first smoothness metric, and to provide a modified video from a viewpoint of the modified motion camera path; and
   performing an additional modification of the modified video using a second smoothness metric corresponding to a reduced crop window size.

2. The method of claim 1 further comprising:
   comparing the first smoothness metric with a first predetermined threshold, wherein applying the crop window transform to crop the video is based on a comparison of the first smoothness metric to the first predetermined threshold.

3. The method of claim 2, the method further comprising:
   selecting the reduced crop window size;
   determining a second crop window transform and the second smoothness metric corresponding to the reduced crop window size;
   determining a change in value between the first smoothness metric and the second smoothness metric; and
   based on comparison of a second predetermined threshold to the change, applying the second crop window transform to crop the modified video to provide a second modified video.

4. The method of claim 3, wherein the comparing the first smoothness metric with the first predetermined threshold provides an indication of a degree of absolute smoothness of the modified motion camera path, and wherein the comparison of the second predetermined threshold to the change provides an indication of a degree of relative smoothness of the modified motion camera path with respect to the respective modified motion camera path.

5. The method of claim 3, further comprising:
iteratively determining successive smoothness metrics using successive reduced crop window sizes; and
based on a comparison of the second predetermined threshold to a respective change in value between two consecutive smoothness metrics, corresponding to two consecutive crop window sizes, applying a given crop window transform, corresponding to a larger crop window size of the two consecutive crop window sizes, to the video to provide the modified video.

6. The method of claim 2, further comprising:
dividing the video into more than one video segment;
for each video segment:
estimating a respective original motion path of the camera that recorded the video segment;
selecting a respective crop window size;
determining a respective crop window transform to transform the respective original motion path of the camera to a respective modified motion camera path, wherein a respective crop window associated with the respective crop window transform is constrained to the respective crop window size;
determining a respective smoothness metric indicative of a respective degree of smoothness of the respective modified motion camera path; and
based on comparison of the respective smoothness metric to the first predetermined threshold, applying the respective crop window transform to the video segment to provide a respective modified video segment from a respective viewpoint of the respective modified motion camera path.

7. The method of claim 6, further comprising:
for each video segment:
selecting a given reduced crop window size;
determining a given crop window transform and a given smoothness metric corresponding to the given reduced crop window size;
determining a given change in value between the respective smoothness metric and the given smoothness metric; and
based on comparison of a second predetermined threshold to the given change, applying the respective crop window transform to the video segment to provide the respective modified video segment.

8. The method of claim 6, wherein dividing the video into more than one video segment comprises dividing the video such that an end portion of a first video segment overlaps a beginning portion of a second video segment consecutive to the first video segment.

9. The method of claim 8, further comprising:
determining a first modified motion camera path $P_1$ for the first video segment; and
determining a second modified motion camera path $P_2$ for the second video segment, wherein $P_2 = P_2 \cdot S$ in the beginning portion of the second video segment overlapping the end portion of the first video segment, wherein S is a scaling transform with a uniform scale $\frac{c_1}{c_2}$, and wherein $c_1$ is a first respective crop window size selected for the first video segment and $c_2$ is a second respective crop window size selected for the second video segment.

10. The method of claim 1, wherein applying the crop window transform to crop the video to provide the modified video from the viewpoint of the modified motion camera path comprises at least one of removing content outside the crop window from at least a portion of the video frame or stabilizing the video.

11. A non-transitory computer readable medium having instructions stored thereon that, when executed by a processing device, cause the processing device to perform operations comprising:
estimating an original motion path of a camera that recorded a video;
selecting a crop window size being less than a size of a video frame of the video;
determining a crop window transform to transform the original motion path of the camera to a modified motion camera path, wherein a crop window associated with the crop window transform is constrained to the crop window size;
identifying a first smoothness metric indicative of a degree of smoothness of the modified motion camera path;
applying the crop window transform to crop the video, in view of the crop window and the first smoothness metric, and to provide a modified video from a viewpoint of the modified motion camera path; and
performing an additional modification of the modified video using a second smoothness metric corresponding to a reduced crop window size.

12. The non-transitory computer readable medium of claim 11, wherein the operations further comprise:
comparing the first smoothness metric with a first predetermined threshold, wherein applying the crop window transform to crop the video is based on a comparison of the first smoothness metric to the first predetermined threshold.

13. The non-transitory computer readable medium of claim 12, wherein the operations further comprise:
selecting the reduced crop window size;
determining a second crop window transform and the second smoothness metric corresponding to the reduced crop window size;
determining a change in value between the first smoothness metric and the second smoothness metric; and
applying one of:
(i) the second crop window transform to the modified video to provide a second modified video, based on the comparing the first smoothness metric with the first predetermined threshold, and
(ii) second the crop window transform to the video to provide a modified video, based on a comparison of a second predetermined threshold to the change.

14. The non-transitory computer readable medium of claim 11, wherein the crop window transform is $B(t)$, where $B(t) = C(t)^{-1} P(t)$, and $C(t)$ is the original motion path and $P(t)$ is the modified motion camera path.

15. The non-transitory computer readable medium of claim 14, wherein the modified motion camera path P(t) is determined by minimizing an objective function $$a\left|\frac{dP}{dt}\right| + b\left|\frac{d^2P}{dt^2}\right| + c\left|\frac{d^3P}{dt^3}\right|,$$

where a, b and c are linear weights such that the crop window associated with the crop window transform B(t) is constrained to the crop window size.

16. The non-transitory computer readable medium of claim 15, wherein minimizing the objective function comprises performing an L1 minimization.

17. The non-transitory computer readable medium of claim 15, further comprising temporally subsampling the original motion path of the camera every $k^{th}$ frame such that the objective function is $$ak\left|\frac{dP}{dt}\right| + bk^2\left|\frac{d^2P}{dt^2}\right| + ck^3\left|\frac{d^3P}{dt^3}\right|,$$

wherein k is a scalar factor.

18. A system comprising:
a memory; and
a processor, operatively coupled to the memory, to:
estimate an original motion path of a camera that recorded a video;
select a crop window size being less than a size of a video frame of the video;
determine a crop window transform to transform the original motion path of the camera to a modified motion camera path, wherein a crop window associated with the crop window transform is constrained to the crop window size;
identify a first smoothness metric indicative of a degree of smoothness of the modified motion camera path;
apply the crop window transform to crop the video, in view of the crop window and the first smoothness metric, and to provide a modified video from a viewpoint of the modified motion camera path; and
perform an additional modification of the modified video using a second smoothness metric corresponding to a reduced crop window size.

19. The system of claim 18, wherein the processor is further to compare the first smoothness metric with a first predetermined threshold, wherein to apply the crop window transform to crop the video is based on a comparison of the first smoothness metric to the first predetermined threshold.

20. The system of claim 19, wherein the processor is further to select the reduced crop window size, to determine a second crop window transform and the second smoothness metric, and to determine a change in value between the first smoothness metric and the second smoothness metric; and
based on a comparison of a second predetermined threshold to the change, to apply the second crop window transform to crop the modified video, and to provide a second modified video.

* * * * *